Patented Aug. 9, 1932

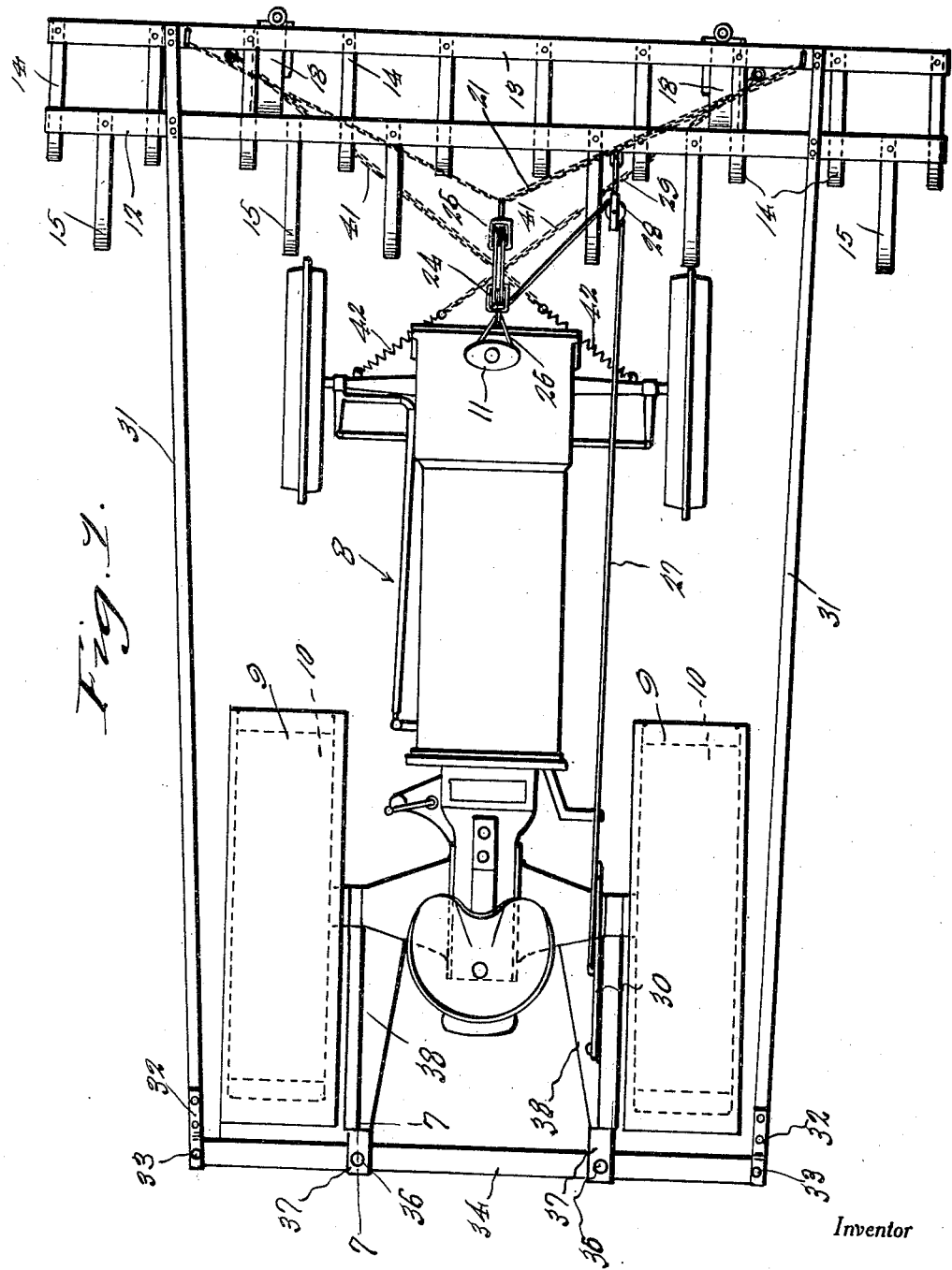

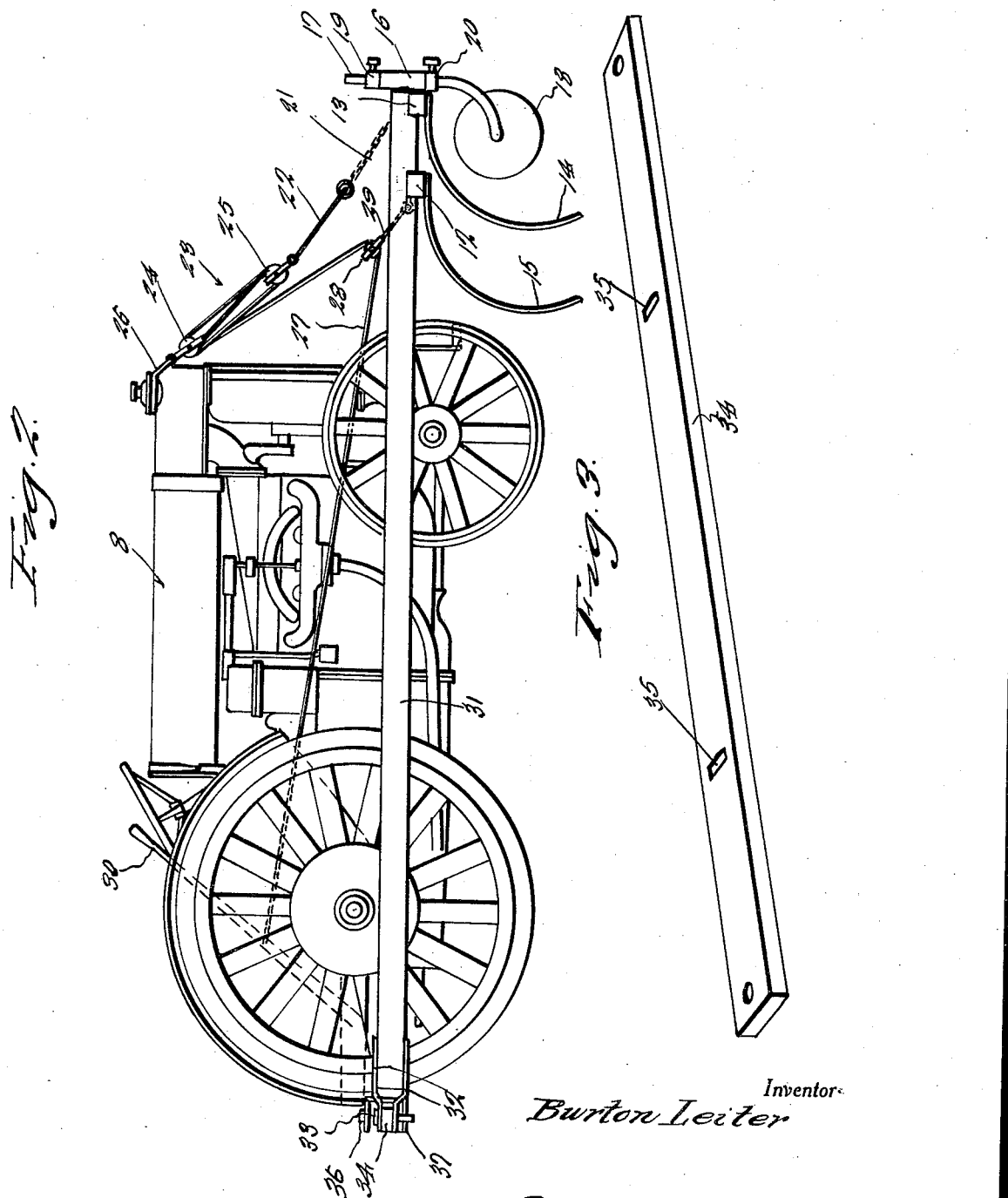

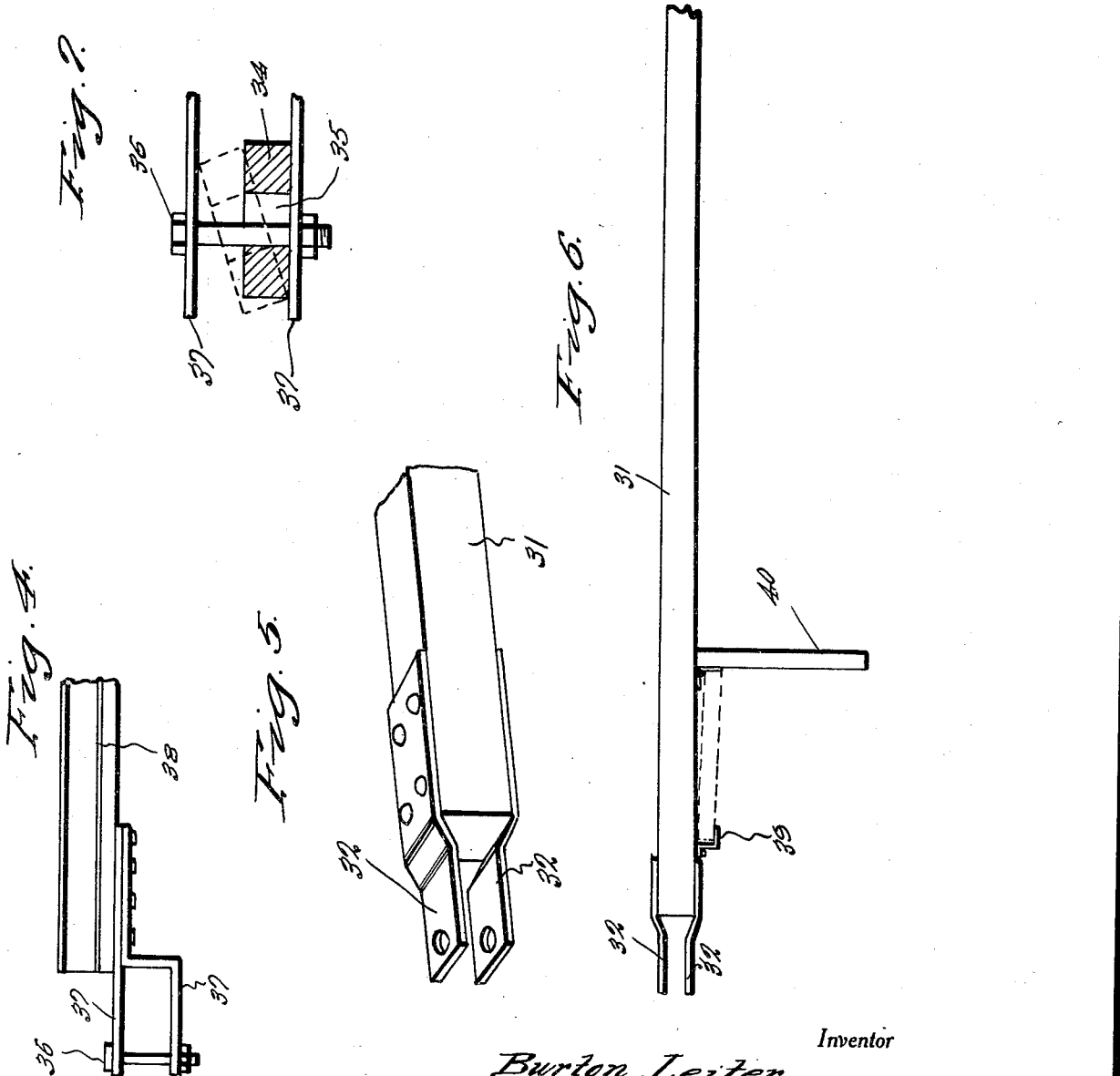

1,870,740

UNITED STATES PATENT OFFICE

BURTON LEITER, OF EDMORE, MICHIGAN

CULTIVATOR

Application filed September 29, 1931. Serial No. 565,876.

This invention relates to an improved farm cultivator, and has more specific reference to a novel introduction in this field of invention of a structurally distinguishable machine characterized by certain appreciable and recognizable refinements and improvements to be hereinafter specified.

In developing the structure intended to accomplish the expected result, I have discovered a seemingly unique arrangement employing a toothed caster supported carriage, and means for operatively connecting it with a conventional or well known power tractor.

One feature of the invention is the particular draft means utilized, this including a transverse horizontal draw bar fastened to the rear portion of the tractor, together with reach rods for delivering the power from the rear of the machine to the front thereof, at which point said means is connected with the afore-said carriage.

Another advantage is predicated upon a cultivator attachment for a tractor wherein the attachment is readily applicable and removable, requiring but a single attendant, and being so constructed as to be self-supporting when detached.

An additional feature is recognized in the specific construction and arrangement of the double beam carriage having a novel staggered tooth arrangement and adjustable casters with the casters arranged in advance of the teeth to regulate the depth of cultivation irrespective of the irregular contour of the land.

Then too, novelty is found in the specific means for raising and lowering the cultivator with respect to the frontal portion of the tractor to provide desired clearance for unhampered transportation.

In the drawings:

Figure 1 is a top plan view of a tractor and the attachment in combination.

Figure 2 is a side view.

Figure 3 is a perspective view of the drawbar.

Figure 4 is a fragmentary edge view of one of the attaching members for the draw bar.

Figure 5 is a fragmentary perspective view of the rear end of one of the longitudinal reach rods.

Figure 6 is a side view of said rod with the temporary supporting legs.

Figure 7 is a detail section on the line 7—7 of Figure 1.

In the drawings, the reference numeral 8 designates a conventional tractor, 9 the rear fender, and 10 the associated rear wheel. The numeral 11 simply designates the filler neck or cap arrangement of the radiator of said tractor.

The toothed carriage is disposed in front or advance of the front wheels of the tractor, and it comprises a pair of spaced parallel rails 12 and 13 carrying the front and rear teeth 14 and 15 respectively. All teeth are of the same construction and in the form of curvate spring strips as indicated in Figure 2. Mounted on the front rail 13 at longitudinally spaced points are retaining brackets or sockets 16 to accommodate the axle portion 17 of the casters. The caster wheel is indicated at 18 and the adjustable clamping collars by the numerals 19 and 20. This allows the elevation of the caster to be regulated so that the caster constitutes the means for regulating the depth of cut of the teeth.

It is important that the casters have a free swivelling action in advance of the cultivating teeth. In addition it is preferable that the teeth be attached to the undersides of the bars or rails 12 or 13.

As seen in Figure 1, a flexible yoke in the form of a lifting chain 21 has its end portions connected to the end portions of the rail 13, and attached to the intermediate portion of the chain by way of a flexible connection 22 is a pulley unit 23 including pulleys 24 and 25, said pulley unit being hung by a clip 26 on the radiator neck as indicated in Figure 2.

The numeral 41 designates criss-cross chains fastened at their outer ends to the front rail 13 and connected by springs 42 to the tractor.

A lifting cable 27 is trained over these pulleys and also over an additional or supplemental pulley 28 which is attached by a link to the bar 12. The cable extends rearwardly where it is connected to a pivotally mounted operating lever 39 on the tractor.

Attached to and extending at right angles and rearwardly from the carriage rails are spaced parallel reach rods 31 having apertured straps 32 at their rear ends fastened by a removable coupling pin 33 to the adjacent apertured ends of the transverse horizontally disposed draft or draw bar 34. The intermediate portions of this bar are formed with slots 35 cooperable with bolts 36 carried by brackets 37 on the rear end of a pair of arms 38 carried by the tractor.

It is important that the cultivator be attached by means of the draw bar 34 in rear of the tractor and that this pulling action be transmitted by the reach rods 31 to the caster supported carriage located in front of the tractor. It is evident that a cultivator of this type can be hitched or unhitched in a minimum amount of time and requires the attention only of a single attendant. It is durable, simple, and economical in construction and operation. The teeth are interchangeable and may be so placed to permit the structure to be changed from a three to a five row cultivator in a few minutes.

The cultivator as is apparent, is so constructed that it is capable of various uses and is very easily operated or handled.

I now call attention to Figure 6 which shows a keeper 39 to accommodate a hinged temporary prop or leg 40. The leg is normally swung to the dotted line position when the cultivator is in use or when the cultivator is removed the leg is swung down to support the reach rod in an elevated position above the ground.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In a structure of the class described, in combination, a tractor, a wheel supported tooth equipped cultivator arranged in advance of the front wheels of the tractor, a draft bar attached to the rear end portion of the tractor, and reach rods separately connected at their rear ends to the draw bar and at their front ends to the cultivator, flexible stay and hoisting means including an operating lever pivotally mounted on the tractor, said operating means embodying a saddle for detachably embracing the filler neck of the tractor radiator.

2. In a structure of the class described, in combination, a tractor provided at its rear end portion with spaced parallel arms having brackets provided with a connecting bolt, a transverse horizontally disposed draw bar having slotted portions confined between the brackets and loosely embracing the bolt, a caster and tooth equipped cultivator disposed in advance of the front wheels of the tractor, and longitudinal reach members separably connected at their rear ends to the draw bar and rigidly fastened at their front ends to the cultivator.

3. In a structure of the class described, in combination, a tractor provided at its rear end portion with spaced parallel arms having brackets provided with a connecting bolt, a transverse horizontally disposed draw bar having slotted portions confined between the brackets and loosely embracing the bolt, a caster and tooth equipped cultivator disposed in advance of the front wheels of the tractor, and longitudinal reach members separably connected at their rear ends to the draw bar and rigidly fastened at their front ends to the cultivator, said reach members being provided with hingedly mounted legs and retaining clips for holding the legs in a folded out-of-the-way position when not in use.

In testimony whereof I affix my signature.

BURTON LEITER.